United States Patent [19]
Ollis, Jr.

[11] 3,972,361
[45] Aug. 3, 1976

[54] THREADED FASTENER
[75] Inventor: Raymond Ollis, Jr., Mentor, Ohio
[73] Assignee: Standard Pressed Steel Co., Jenkintown, Pa.
[22] Filed: May 17, 1974
[21] Appl. No.: 470,848

Related U.S. Application Data
[63] Continuation of Ser. No. 257,730, May 30, 1972, abandoned.

[52] U.S. Cl. .................................... 151/22; 151/37
[51] Int. Cl.² ......................................... F16B 39/30
[58] Field of Search ............. 151/22, 37; 85/41, 43, 85/47, 46

[56] References Cited
UNITED STATES PATENTS

| | | | |
|---|---|---|---|
| 3,078,899 | 2/1963 | MacLean | 151/37 |
| 3,176,746 | 4/1965 | Walton | 151/22 |
| 3,339,389 | 9/1967 | Mosow | 151/22 |

FOREIGN PATENTS OR APPLICATIONS
71,848  11/1893  Germany ............................. 151/22

Primary Examiner—Roy D. Frazier
Assistant Examiner—Thomas J. Holko
Attorney, Agent, or Firm—Andrew L. Ney; Aaron Nerenberg

[57] ABSTRACT

A vibration resistant fastener such as a screw or bolt provided with a series of serrations on the load bearing flank of the thread of a screw or bolt so that the serrations will bear on the pressure flank of a mating thread. Each serration is formed with an inclined ramp terminating in a substantially vertical buttress with the smoothly inclined surface of the ramp being oriented in the direction of tightening so that the buttress presents a surface tending to act against rotation of the fastener to preclude loosening of the screw or bolt.

3 Claims, 5 Drawing Figures

THREADED FASTENER

This application is a continuation of application Ser. No. 257,730 filed May 30, 1972 for Threaded Fastener and now abandoned.

The present invention relates to vibration resistant threaded fasteners and, in particular, to vibration resistant bolts or screws such as set screws.

In many applications utilizing a threaded fastener such as a set screw where the set screw is threadably engaged within one workpiece to have an end bear against and frictionally grip a second workpiece to secure the two workpieces together it is imperative, especially where the workpieces are subjected to vibration, to insure that the vibrations do not loosen the set screw so that the workpieces can move relative to each other. Accordingly, set screws have been designed with anti-rotation features in an attempt to minimize loosening or back-off of the set screw when the workpieces in which it is installed are subjected to vibration. One suggested solution is to provide the seating end or point of the set screw with an irregular configuration, for example a knurled cup configuration, so that the knurled end of the set screw achieves a degree of purchase when it bears against the surface of the workpiece. However, the surface area of the set screw end is necessarily limited so that the frictional engaging surface is also limited and such set screws have not provided an entirely satisfactory rotation resistant feature.

Accordingly, it is an object of the present invention to provide a rotation resistant threaded fastener such as a set screw which has noticeably improved rotation resistant properties when installed in a workpiece.

It is a still further object of the present invention to provide a rotation resistant threaded fastener which may be economically manufactured on a mass production basis and which provides improved rotation resistant properties.

It is a still further object of the present invention to provide a threaded fastener which exhibits markedly improved rotation resistant properties and which may be repeatedly engaged and disengaged from the workpieces in which it is employed without marked deterioration in the rotation resistant property of the fastener.

In accordance with a preferred embodiment of the present invention an irregular surface configuration is imparted to the flank of the threads of a threaded fastener member which bears the load when the fastener is in compressive loading. The irregular surface configuration on the thread flank is in the form of an inclined ramp and buttress with the incline of the ramp being in the direction of rotation to engage the threaded fastener. Thus, once the fastener is fully seated and engaged the buttress of each of the serrations resists the tendency of the threaded fastener to rotate in the opposite direction and back off.

These and other objects and advantages of the present invention will be more readily apparent after consideration of the following specification in conjunction with the drawing.

Figure 1:
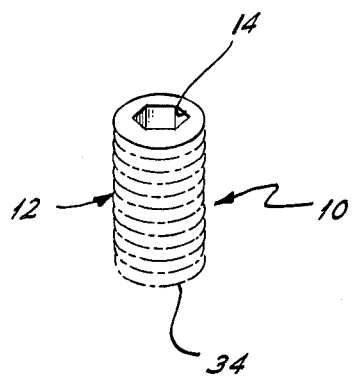
FIG. 1 is a perspective view showing a preferred embodiment of a threaded fastener according to the present invention.

With reference now to the drawing and particularly FIG. 1, the threaded fastener 10 constructed in accordance with the present invention is shown illustratively as a socket set screw comprising a standard thread configuration 12 along the exterior surface of the screw 10 and including a suitable indentation 14 in one end of the screw 10 to receive a wrenching member to permit the set screw 10 to be rotated into engagement in a cooperating threaded bore in a workpiece.

Figure 2:
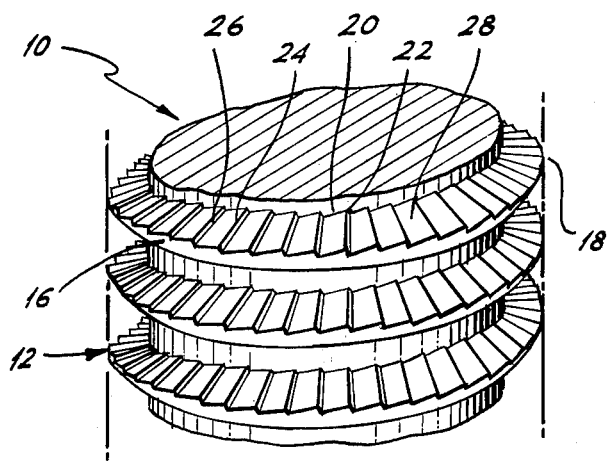
FIG. 2 is an enlarged perspective view showing one embodiment of the irregular surface configuration placed on the load bearing flank of the threads of a threaded fastener member according to the present invention.

As best seen in FIG. 2, the load bearing flank 16 of each individual thread 18 is provided with an irregular serrated configuration 20 around the circumference of the thread to provide a rotation resistant property to the set screw 10 when it is engaged in a threaded receiving bore and a compressive load is impressed on the fastener.

When serrations 20 are viewed along a cylinder concentric with the longitudinal axis of the screw the serrations are seen to be in the form of teeth. For the particular embodiment illustrated in FIG. 2, the teeth are generally saw-tooth in shape and each include a substantially vertical wall or buttress 22 extending between the crest 24 of a given tooth and the root 26 of an adjacent tooth. An inclined surface or ramp 28 extends between the crest 24 and the root 26 of an adjacent tooth. The ramp 28 of each serration is inclined with respect to a plane parallel to the helix angle of the thread formation of the screw 10 at an angle of between 5° and 25°.

Figure 3:
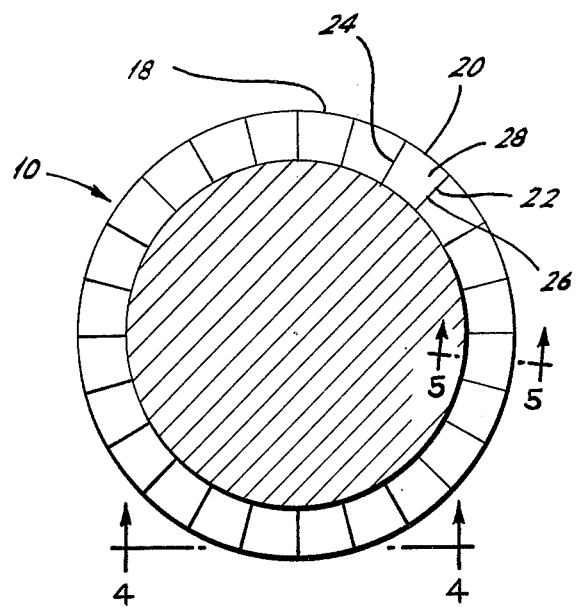
FIG. 3 is a sectional view taken along the helix angle of the thread of the embodiment of FIG. 2 diagrammatically showing the orientation of the irregular surface configuration on the load bearing flank of a thread.

In the embodiment shown in FIGS. 2 and 3, the wall or buttress 22 of each serration is radially disposed and lies in a plane coincident with a plane passing through the longitudinal axis of the screw 10.

Figure 5:
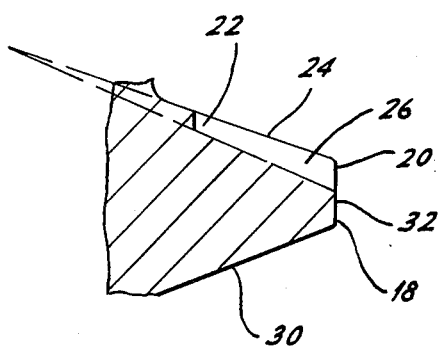
FIG. 5 is an elevational view taken on the line 5 — 5 of FIG. 3.

As best seen in FIG. 5, the height of buttress 22 varies along the flank 16 of each thread from a minimum radially inwardly of the pitch diameter of the screw thread, shown at 30, and gradually increasing to a maximum depth at the crest 32 of a thread 18.

The ramp 28 of each serration 20 is inclined in the direction of rotation of the screw 10 when it is rotated towards its engaging position, i.e. clockwise for a right-hand thread. Thus, during rotation of the screw 10 into engagement within a cooperatively threaded receiving bore in a first workpiece, and before any compressive load is applied to the screw 10, the walls or buttresses 22 of each serration provide no frictional impedence to the rotational engagement of the screw 10. Once the screw is seated so that a workpiece contacting end 34 contacts a second workpiece, or once a compressive load is induced on the screw, further inward movement of the screw 10 becomes restricted. Continual application of a seating torque until a predetermined load is reached impresses a compressive load on the screw 10.

Figure 4:
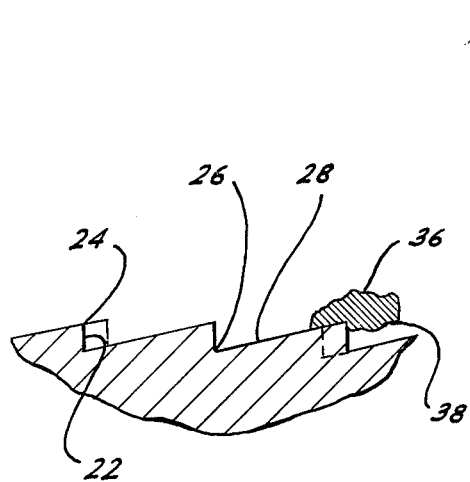
FIG. 4 is an elevational view taken on the line 4 — 4 of FIG. 3 with a partial showing of a mating thread configuration.

As the compressive load increases on set screw 10, the load bearing flank 16 of each of the threads of the screw 10 is forced into more intimate contact with a mating thread flank in the internally threaded receiving bore in the workpiece in which the set screw 10 engaged. This compressive force between the load bearing flanks of the mating thread forms results in a substantially elastic deformation of the load bearing flank of the internal thread configuration in the workpiece so that, in essence, the ramp 28 of each serration is depressed into the mating load bearing flank of the internally threaded workpiece, shown at 36 in FIG. 4, so that there is a slight lapping over of the material from the workpiece, as at 38, against the buttress 22. This slight deformation in the internal thread configuration of the workpiece as it abuts against the buttress 22 of each of the serrations 20 precludes rotation of the set screw in the opposite direction which would tend to loosen the set screw or back it off from engagement with the second workpiece.

While the depression is slight at each serration so that an appropriate "off" torque may be applied to loosen the set screw, the locking action provided by the multiplicity of serrations affords sufficient anti-rotation resistance to effectively preclude the set screw from backing when the workpieces are subjected to vibration. Because the individual deformation adjacent each buttress 22 is essentially elastic in nature, no appreciable damage or distortion results to the thread configuration on either the screw 10 or the mating internal thread configuration of the workpiece in which it is engaged.

Thus, it is seen that the present invention provides a screw form which exhibits markedly improved rotation resistant properties without deleterious effects which mar or distort either the thread configuration of the screw itself or the mating thread configuration in a workpiece in which it is installed. Thus, the screw may be employed through repeated cycles without noticeable loss of effectiveness.

While the present invention has been described illustratively as a set screw, it is to be expressly understood that the invention may be employed on any type of threaded fastener such as a bolt or screw to be engaged in a threaded bore in a workpiece or to be engaged within a nut.

What is claimed is:

1. A vibration resistant fastener comprising a shank having at least a portion of its length provided with an external thread including a root and a crest, at least a portion of said thread formed with an irregular surface on the flank subjected to a compressive load when said fastener is engaged in a workpiece, said irregular surface configuration comprising a plurality of serrations in the form of teeth when viewed along a cylinder concentric with the longitudinal axis of said fastener, said teeth extending inwardly from the crest of said thread to termination inwardly of the pitch diameter at a point spaced from said thread root, each of said teeth comprising a ramp inclined in the direction of rotation of engaging said fastener in the workpiece, said ramp extending from a root to a crest thereof with a buttress extending between said crest and the root of an adjacent serration in a plane generally parallel with the longitudinal axis of said fastener, the height of said buttress between said crest and the root of an adjacent serration being greater at said thread crest than at said point spaced from said thread root, said teeth being formed on the flank subjected to a compressive load in such a manner that said teeth do not provide frictional impedance to the engagement of the fastener in a mating thread of the workpiece until a compressive load is applied to said fastener.

2. A vibration resistant fastener in accordance with claim 1 wherein said inclined ramp of each of said teeth forms an angle of between 5 to 25 degrees with a plane parallel to the helix angle of said thread.

3. A vibration resistant fastener comprising a shank having at least a portion of its length provided with an external thread including a root and a crest, at least a portion of said thread formed with an irregular surface on the flank subjected to a compressive load when said fastener is engaged in a workpiece, said irregular surface configuration comprising a plurality of serrations in the form of teeth when viewed along a cylinder concentric with the longitudinal axis of said fastener, said teeth extending inwardly from the crest of said thread to termination inwardly of the pitch diameter at a point spaced from said thread root, each of said teeth comprising a ramp inclined in the direction of rotation of engaging the fastener in the workpiece, said ramp extending from the root to the crest thereof with a buttress extending between said crest and the root of an adjacent serration, said inclined ramp of each of said teeth forming an angle of between 5 and 25 degrees with a plane parallel to the helix angle of said thread, the height of said buttress between said crest and the root of an adjacent serration being greater at said thread crest than at said point spaced from said thread root, said teeth being formed on the flank subjected to a compressive load in such a manner that said teeth do not provide frictional impedance to the engagement of the fastener in a mating thread of the workpiece until a compressive load is applied to said fastener.

* * * * *